March 6, 1951 — F. SCHAEFER — 2,544,398
CONNECTING MEMBER WITH FORKED ENDS
Filed Feb. 8, 1949
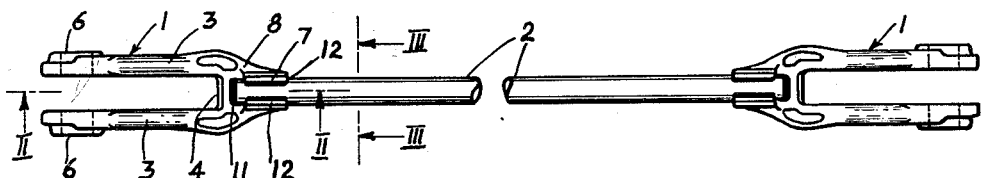
Fig. 1.
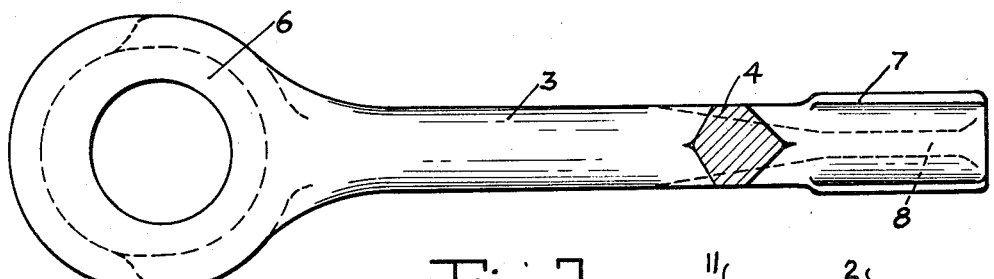
Fig. 2.
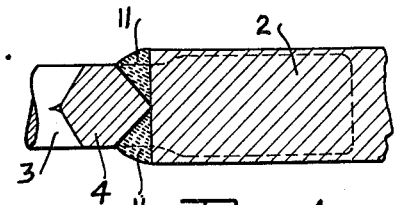
Fig. 4.
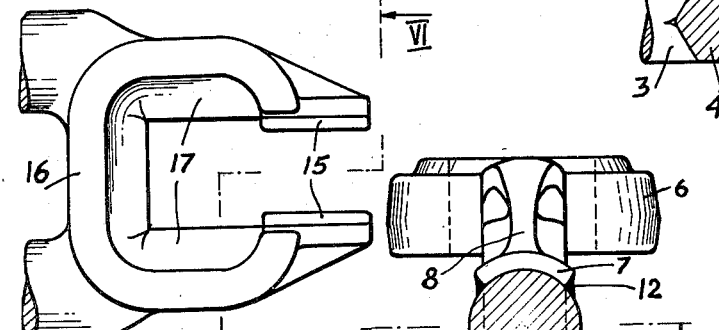
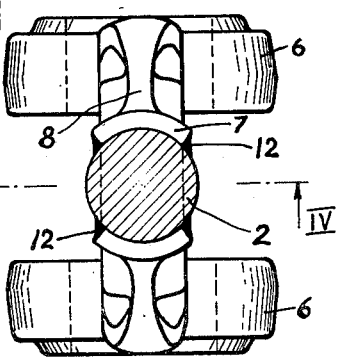
Fig. 5.
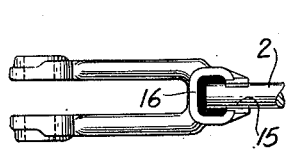
Fig. 7.
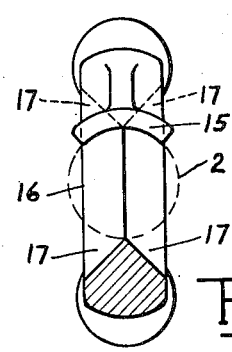
Fig. 6.
Fig. 3.
INVENTOR.
Frederic Schaefer
BY Brown, Critchlow, Flick & Peckham
his ATTORNEYS.

Patented Mar. 6, 1951

2,544,398

UNITED STATES PATENT OFFICE 2,544,398

CONNECTING MEMBER WITH FORKED ENDS

Frederic Schaefer, Pittsburgh, Pa., assignor to Schaefer Equipment Company, Pittsburgh, Pa., a corporation of Pennsylvania Application February 8, 1949, Serial No. 75,194

5 Claims. (Cl. 287—20.2)

This invention relates to forked connecting members, and more particularly to the connections between the ends of a rod and the forks by which it is connected in operative position.

It is among the objects of this invention to provide such a connecting member in which the forks hold the rod in position while they are being welded to it, in which weld receiving grooves are formed between the forks and the rod, in which the welds do not weaken the rod appreciably, and in which the welds are subjected only to forces acting lengthwise of the rod.

In accordance with this invention, a pair of metal forks are mounted on opposite ends of a metal rod. Each fork has at its inner end a pair of spaced parallel jaws extending inwardly along the side of the adjoining end portion of the rod. The sides of these jaws, for at least part of their length, are joined by welds with the side surface of the rod. The end surfaces of the rod also may be welded to the adjoining forks. Preferably, the portion of each fork that extends across the adjoining end surface of the rod is tapered from its opposite sides toward the axis of the rod to form with the end of the rod a pair of inwardly tapered grooves in which the end welds can be made. Similar welding grooves may be formed in like manner along the adjoining portions of the jaws, but at least the free end portions of the jaws extend far enough around the rod in engagement with it to hold the rod in proper position while it is being welded to the forks.

The invention is illustrated in the accompanying drawings in which Fig. 1 is a side view of a connecting member; Fig. 2 is an enlarged section through one of the forks taken on the line II—II of Fig. 1; Fig. 3 is an enlarged inner end view of a fork and a cross section through the rod taken on the line III—III of Fig. 1; Fig. 4 is a fragmentary section through one end of the rod and fork taken on the line IV—IV of Fig. 3; Fig. 5 is a fragmentary side view of the jaw end of a modified fork; Fig. 6 is a combined end view and section of the fork taken on the line VI—VI of Fig. 5; and Fig. 7 is a reduced side view of the modified fork shown in Figs. 5 and 6, welded to a rod.

Referring to Figs. 1 to 4 of the drawings, a pair of forged connecting elements, such as metal forks 1, are mounted on the opposite ends of a metal rod 2 that generally is cylindrical. The principal portion of each fork is formed from parallel arms 3 integrally connected at their inner ends by a cross member 4. The outer ends of the arms are enlarged and perforated to form eyes 6 in which a connecting pin can be inserted for connecting the fork to an actuating member or to a member which the connecting rod is intended to operate. The inner ends of the fork arms have extensions beyond the cross member which form parallel jaws that receive between them the adjoining end portion of the rod. Each jaw has a relatively thin wall 7 which extends part way around the rod and which is reinforced by a central rib 8 tapered toward the free end of the jaw. Wall 7 is curved transversely so that it will conform to the curvature of the rod, and is wide enough to extend about a quarter of the way around the rod, or at least far enough to prevent the rod from sliding out between the sides of a pair of jaws. The rod therefore has to be inserted endwise between the jaws where it fits rather snugly so that any lateral strain on it relative to the forks is taken by the jaws directly.

The forks are permanently connected to the rod by welding. To facilitate this, the cross member 4 that connects the inner ends of the fork arms 3 is tapered from its opposite sides toward the axis of the rod, as shown in Figs. 2 and 4, so that it forms with the end surface of the rod a pair of inwardly tapered grooves. Arc welding may be done in these grooves to deposit welding metal 11 that will join the cross member to the end of the rod. In many cases this may be all the welding that is necessary. If desired, however, other welds 12 may be made along the opposite sides of each jaw in the shallow grooves between the edges of walls 7 and the side surface of the rod for joining the jaws to the rod, as shown in Figs. 1 and 3. As such welds extend lengthwise of the rod, they do not weaken the rod in tension or compression. No jig needs to be used for holding the rod and forks together during welding, because the jaws correctly position the rod in the forks.

This connecting member is especially suitable for railroad cars for connecting the brake cylinder with the live lever of the brake rigging. The rods and forks can be shipped separately to the car manufacturer, as he can readily weld the forks onto the ends of the rods with ordinary arc welding equipment. Such connecting members are subjected only to tension for which purpose the welded connections disclosed herein are as strong as the rod itself.

In the modification shown in Figs. 5 and 6 and 7, the curved jaw walls 15 are much shorter than walls 7 described above, and the portions of the jaws between those walls and the cross member 16 of the fork are tapered from their opposite sides toward the rod 2 in the same manner as the cross member. These tapered portions form with the side of the rod a pair of wide inwardly tapered grooves 17 for receiving welding metal that joins the jaws to the rod. Welding also is done in the tapered grooves formed between the cross member and rod end. It is preferred not to weld the curved walls 15 to the rod. All of the welding therefore is done around the tip of the rod while it is held in place by the curved walls of the jaws.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A rod joint comprising a metal rod, a metal connecting element mounted on an end of the rod, said element having at its inner end a pair of spaced parallel jaws integrally connected by a cross member extending across the adjoining end surface of the rod, the jaws extending inwardly along the side surface of the adjoining end portion of the rod, the end surface of the rod being welded to said cross member and welds joining the sides of the jaws with said side surface.

2. A rod joint comprising a metal rod, a metal connecting element mounted on an end of the rod, said element having at its inner end a pair of spaced parallel jaws extending inwardly along the side surface of the adjoining end portion of the rod, a portion of the element extending across the adjoining end surface of the rod and being tapered from its oppostie sides toward the axis of the rod to form with the end of the rod a pair of inwardly tapered grooves, welds in said grooves joining the element with said end surface, and welds joining the sides of the jaws with said side surface.

3. A rod joint comprising a cylindrical metal rod, a metal connecting element mounted on an end of the rod, said element having at its inner end a pair of spaced parallel jaws extending inwardly along the adjoining end portion of the rod in engagement with its side surface, each jaw having an inner surface curved transversely to conform to the cylindrical surface of the rod and extending substantially quarter way around the rod, four substantially parallel welds joining the sides of the jaws with said rod surface, a portion of the connecting element extending across the adjoining end surface of the rod, and welds joining said portion to said end surface.

4. A rod joint comprising a metal rod, a metal connecting element mounted on an end of the rod, said element having at its inner end a pair of spaced parallel jaws extending inwardly along the adjoining end portion of the rod, the free end portion of each jaw extending part way around the rod in engagement with it, the rest of the jaw having its opposite sides converging to an inner edge extending lengthwise along the side of the rod to form with the rod a pair of inwardly tapered wide grooves, and welds in said grooves joining the jaw with the side of the rod.

5. A rod joint comprising a metal rod, a metal connecting element mounted on an end of the rod, said element having at its inner end a pair of spaced parallel jaws extending inwardly along the adjoining end portion of the rod, the free end portion of each jaw extending part way around the rod in engagement with it, the rest of the jaw being tapered from its opposite sides toward the rod to form with the rod a pair of inwardly tapered wide grooves, a portion of the connecting element extending across the adjoining end surface of the rod and being tapered from its opposite sides toward the axis of the rod to form with the end of the rod another pair of inwardly tapered grooves, and welds in all of said grooves joining the connecting element with the sides and end of the rod.

FREDERIC SCHAEFER.

REFERENCES CITED

The following references are of record in the file of this patent:

UNITED STATES PATENTS

| Number | Name | Date |
|---|---|---|
| 617,484 | Haskell | Jan. 10, 1899 |
| 740,865 | Jenkins | Oct. 6, 1903 |
| 2,050,553 | Barney | Aug. 11, 1936 |
| 2,198,744 | Schwemlein | Apr. 30, 1940 |
| 2,480,958 | Pietzsch | Sept. 6, 1949 |

FOREIGN PATENTS

| Number | Country | Date |
|---|---|---|
| 606,469 | France | Mar. 9, 1926 |